Figure 3:
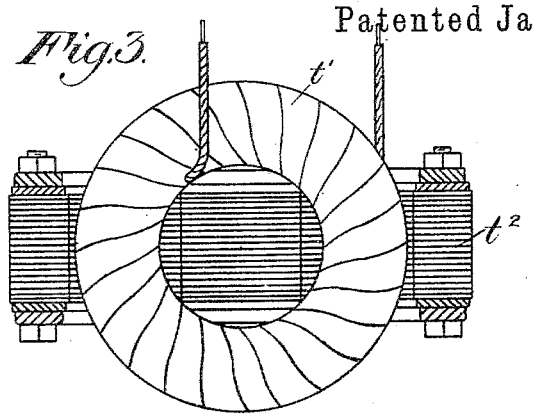

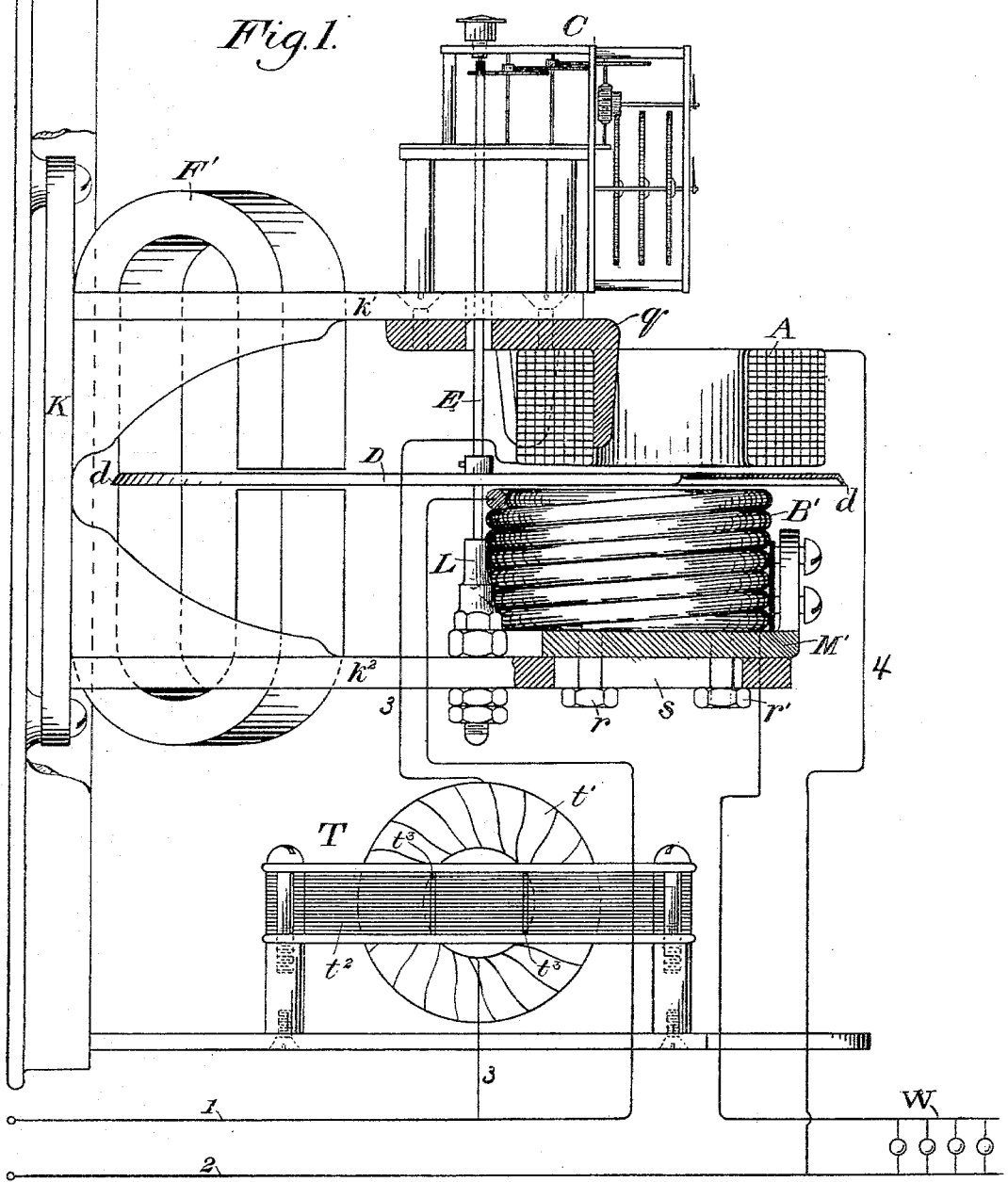

(No Model.)  5 Sheets—Sheet 2.
O. B. SHALLENBERGER.
METHOD OF AND MEANS FOR MEASURING ALTERNATING ELECTRIC CURRENTS.
No. 531,867. Patented Jan. 1, 1895.
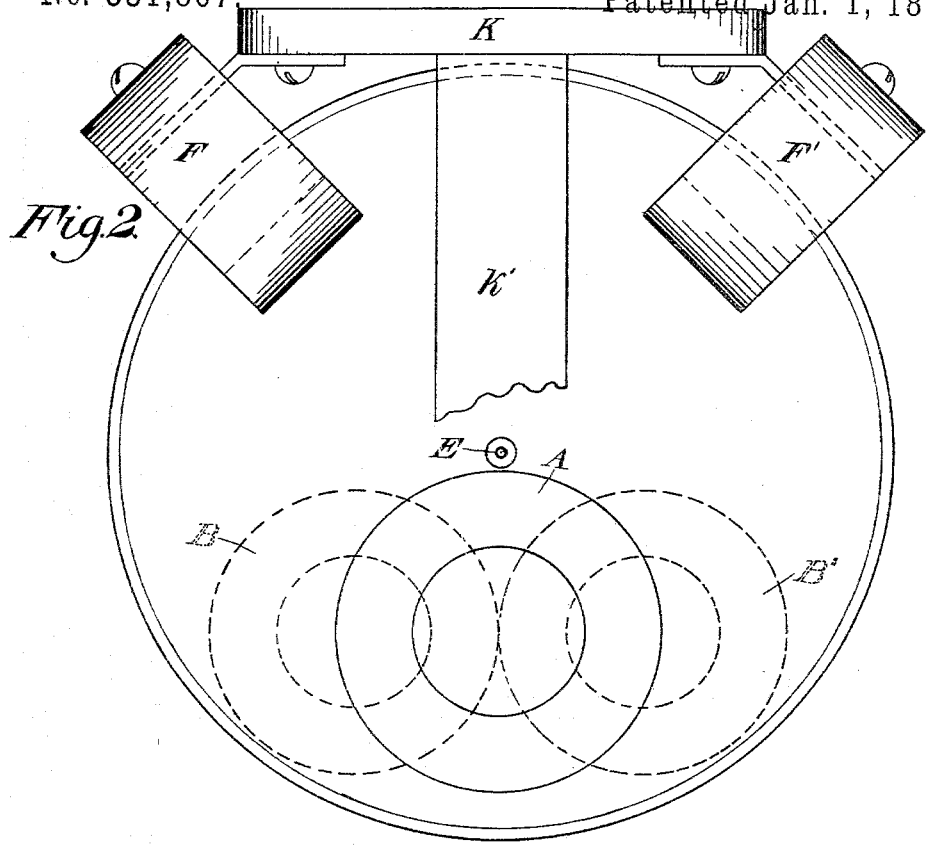
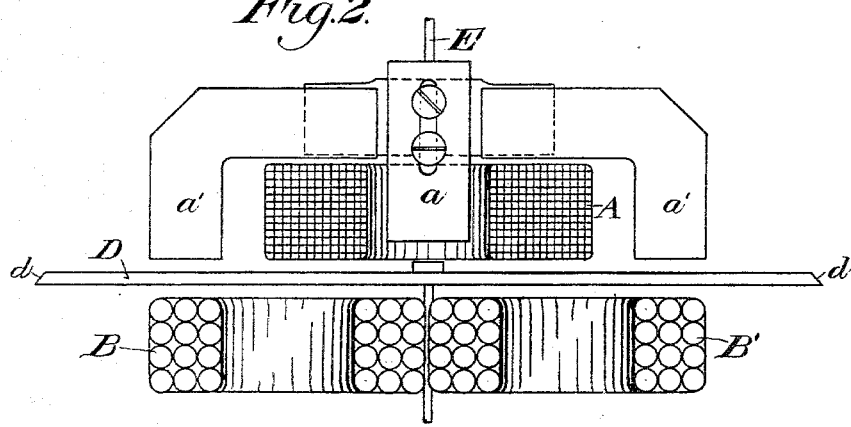

(No Model.) 5 Sheets—Sheet 3.

O. B. SHALLENBERGER.
METHOD OF AND MEANS FOR MEASURING ALTERNATING ELECTRIC CURRENTS.

No. 531,867. Patented Jan. 1, 1895.

WITNESSES:

INVENTOR
Oliver B. Shallenberger.
BY
ATTORNEYS (No Model.) 5 Sheets—Sheet 4.
O. B. SHALLENBERGER.
METHOD OF AND MEANS FOR MEASURING ALTERNATING ELECTRIC CURRENTS.
No. 531,867. Patented Jan. 1, 1895.
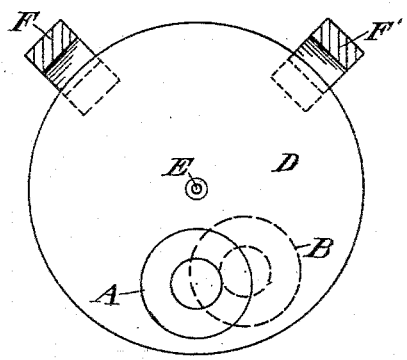
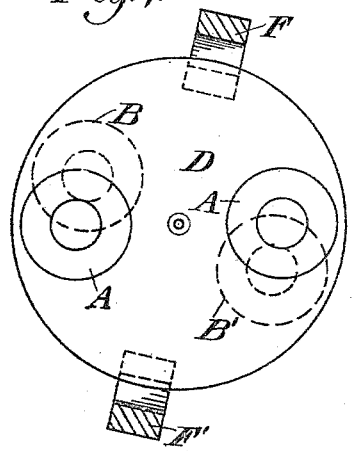
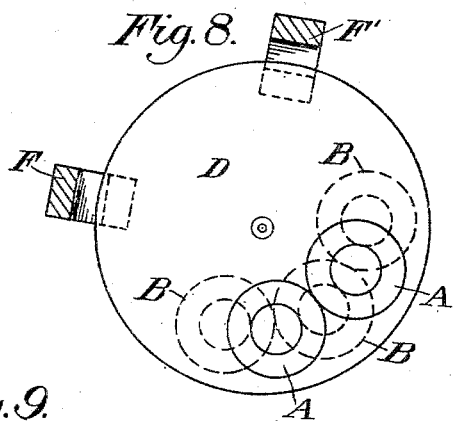
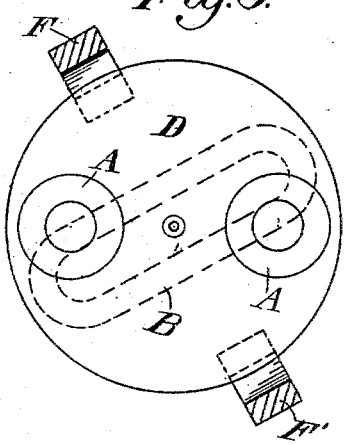
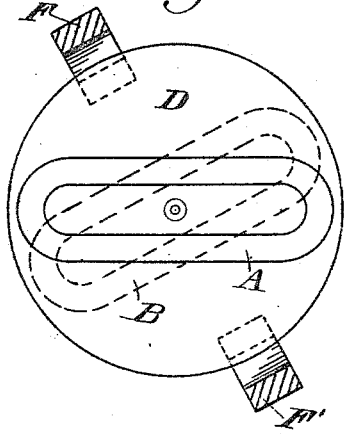

(No Model.)

5 Sheets—Sheet 5.

O. B. SHALLENBERGER.
METHOD OF AND MEANS FOR MEASURING ALTERNATING ELECTRIC CURRENTS.

No. 531,867. Patented Jan. 1, 1895.

WITNESSES:

INVENTOR

BY

ATTORNEYS

UNITED STATES PATENT OFFICE.

OLIVER B. SHALLENBERGER, OF ROCHESTER, PENNSYLVANIA.

METHOD OF AND MEANS FOR MEASURING ALTERNATING ELECTRIC CURRENTS.

SPECIFICATION forming part of Letters Patent No. 531,867, dated January 1, 1895.

Application filed September 19, 1894. Serial No. 523,516. (No model.)

*To all whom it may concern:*

Be it known that I, OLIVER B. SHALLENBERGER, a citizen of the United States, residing at Rochester, in the county of Beaver and State of Pennsylvania, have invented a new and useful Improvement in Methods of and Means for Measuring Alternating Electric Currents, (Case No. 612,) of which the following is a specification.

My invention relates to the construction and operation of meters for alternating electric currents, and particularly to that class in which there is a movable element operated inductively by the influence of two alternating magnetic fields of different phase. The invention involves also an inductance coil.

The object of the invention is to provide a meter which will afford an approximately accurate registration of the true energy, as distinguished from the so-called apparent energy, consumed upon an alternating current electric circuit, and in which the accuracy of the indications will not be practically affected by considerable changes in the rate of alternation nor by such variations in electromotive force as are liable to occur upon a given circuit. The meter may even be constructed to register correctly under such wide variations in electromotive force as to be suitable for use upon circuits of different normal voltages or upon constant current circuits with varying differences of potential, without change of construction or winding.

A further object of the invention is to so organize the meter that it will have very little friction and will measure very small currents as well as currents of considerable quantity, without the use of an auxiliary winding or starting device which would render it liable to continue in operation when no translating devices are in circuit.

For these purposes I have constructed a meter having as essential elements a movable armature inductively affected by two circuits, one of which is either connected in series with the work circuit or receives a current proportional to that flowing in the work circuit, while the other is connected in a shunt circuit subjected to the electromotive force upon the main circuit, or an electromotive force proportional thereto. The current flowing through the shunt circuit is modified by the presence of an inductance coil of novel character, which is connected therein.

Meters have heretofore been devised having a certain amount of self-induction in the shunt circuit, for the purpose of producing a torque, but they have failed to correctly measure the energy of alternating currents for several reasons, one of which is the fact that insufficient lag is produced in the shunt circuit. Thus if a meter be constructed in which the lag produced in the shunt circuit is, say, forty-five degrees, a torque will be produced equal to practically seven-tenths of the maximum attainable, which corresponds to a lag of ninety degrees. A correct registration may result under certain definite conditions. The registration will not, however, be correct if the lag in the work circuit changes. This will become apparent when it is considered that if the load upon the work circuit possesses sufficient self-induction to also produce a lag of forty-five degrees, no torque will be developed, since the shunt and the series circuits will then be in the same phase, and consequently no registration of the meter will occur, although the consumption of energy may be great. Furthermore, if the lag upon the work circuit should be in excess of forty-five degrees, the torque upon the armature will be exerted in the opposite direction and the meter will run backward.

It is well known that the energy of an alternating current is equal to the product of the current, the electromotive force and the cosine of the phase angle between the current and the impressed electromotive force. This being the case, the registration of the meter should follow a corresponding law, and for any given current and electromotive force, the registration should therefore diminish as the cosine of the angle of lag of the work current, and consequently should become zero when the lag reaches ninety degrees, since ninety degrees is the angle corresponding to a zero value of the cosine. These are the conditions under which no actual energy is transmitted by the current and therefore the meter should give no indication. In order that this law of operation should exist in the meter, it is necessary to so organize the shunt circuit that the current in it shall lag as nearly as possible ninety degrees behind the electromotive force. I have found that in the form of meter herein described, the torque for any given current and electromotive force is proportional to the sine of the angular displacement of phase between the currents in the shunt and the series coils, and hence, if the current in the shunt is caused to lag approximately ninety degrees, the torque is also proportional to the cosine of the lag-angle in the work circuit, since these two angles are then complementary.

While the language here used applies in a mathematical sense only to alternating currents of sinusoidal wave form, I do not limit myself to the use of such currents, and I employ the terms ordinarily used in order to simplify the explanation. My invention is practically operative in connection with the usual wave forms employed in practice, and correctly measures the energy transmitted by such currents.

To correctly measure the actual energy transmitted, it is also essential that the registration should be directly proportional to the electromotive force. Any ordinary construction of the shunt circuit, as for instance, one including an inductance coil having a closed magnetic circuit, would not secure this result because the current therethrough would not vary in direct proportion with the electromotive force owing to variations in the coefficient of self-induction, but in some other proportion dependent upon the quality of the iron cores employed and the degree of magnetic saturation. As a result the variations in the registration of the meter would be quite different from the variations of electromotive force. To obviate this difficulty, I have so organized a shunt circuit that the magnetic field acting upon the armature is directly proportional to the electromotive force of the circuit.

Meters heretofore devised have been sensitive to changes in the rate of alternations of the current to such a degree as to render them unfitted for use upon circuits employing a rate of alternation other than that for which they were specially designed, or upon circuits having wide fluctuations in periodicity. In the meter which I have devised, the torque for given currents in the coils and for a given difference of phase is directly proportional to the periodicity. This is because the inductive effects produced in the movable element of the meter are proportional to the field strength and the number of reversals per second; and consequently the torque, which depends upon these inductive effects, is also proportional to the number of reversals for a given strength of the inducing field. For a given periodicity the torque is also proportional to the strength of the field in the shunt circuit, other conditions remaining constant. It follows from these two considerations that in order to obtain a registration of the energy independent of the periodicity, the strength of the magnetic field dependent upon the shunt circuit must vary inversely as the periodicity—that is to say, any tendency to increase the torque, for instance, by increased periodicity, must be exactly counteracted by a proportonal diminution of the field produced by the shunt circuit. The shunt circuit of the meter herein described is so organized as to effect this compensation through a wide range. It is also important that the form of the current wave in the shunt circuit shall follow as nearly as possible the form of the wave of electromotive force, so that the indication or registration shall be accurate independently of the exact wave form of the generator. If an inductance coil of ordinary construction, that is, with a closed magnetic circuit, were placed in the shunt circuit of the meter, the current would be much distorted as to its wave form, by reason of the well-known magnetic peculiarities of iron, such as varying permeability and hysteresis. This difficulty also is overcome by the use of the form of inductance coil herein described.

In an inductance coil having a closed iron core, the mass of iron necessary to secure, at low magnetization, a sufficient shunt circuit, say one-tenth of an ampère, at ordinary potentials, is inconveniently large in practice, and moreover, the lag is insufficient owing to the small ratio between the apparent energy of the magnetizing current and the actual energy expended in hysteresis losses. At high magnetization the lag may be somewhat greater although it cannot be made sufficient for the purpose except by working the iron entirely beyond practical limits. In any case, whether the magnetization be high or low, the permeability of the iron and consequently the coefficient of self-induction of the coil varies not only under moderate variations of the mean impressed electromotive force but during variations of a single alternation, so that from this cause and the effects of hysteresis, both the current and the form of its waves are greatly modified. On the other hand, it is well-known that an air core inductance coil may possess an approximately straight line law of magnetization, but difficulties are encountered in obtaining a sufficiently great lag angle. The degree of lag of an alternating current is directly dependent upon the ratio of the true energy of the current, to the so-called apparent energy. Hence it is necessary to avoid, as far as possible, all actual consumption of energy in any circuit in which a large lag angle is desired.

In an air core inductance coil, the number of turns required is necessarily large in order to secure a high coefficient of self-induction. This causes a high resistance and corresponding expenditure of energy proportional to the square of the current, and consequently such coils do not produce a very large lag under practical conditions. The same may be said of a coil with a straight core as ordinarily constructed. In order to overcome these difficulties, I employ an inductance coil with an interrupted magnetic circuit consisting of a laminated or otherwise divided core inclosing the winding and having an air gap of definite length. The exact proportions in a given coil must be found by calculation, and are determined with reference to the requirements and precautions hereinbefore indicated, and the instructions which follow. The length of the air gap should be sufficient to render the total reluctance or resistance of the magnetic circuit greatly in excess of the reluctance of the iron portion alone, and its exact length is determined also with reference to the current permitted in the shunt circuit of the meter and of the winding of the inductance coil. The winding must be adapted to the working range of the meter and must have a sufficient number of turns to maintain a high coefficient of self-induction without requiring either a high magnetization or an inconveniently great cross-section in the magnetic circuit. On the other hand, it must be of low resistance relatively to the self-induction, which makes it necessary to give the air gap only a moderate length, so that the reluctance is not too great to be suited to such a winding. The winding and the cross-section of the iron must also be so proportioned to each other as to make the sum of the losses in the iron and those due to resistance, as nearly a minimum as possible over the working range, so as to increase the lag-angle to the greatest degree possible. These proportions are all modified by the permissible dimensions of the coil, and the quality of the iron used; but having assumed these, the proportions are susceptible of exact calculation.

Figure 4:
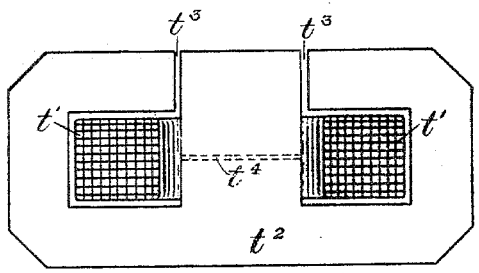
Figure 5:
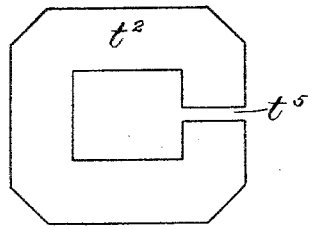
Figure 11:
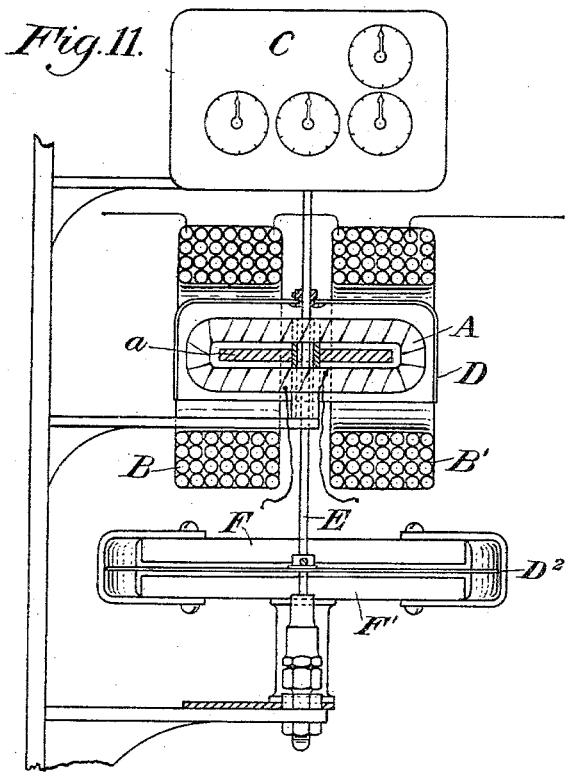

In the accompanying drawings illustrating an application of the invention, Figure 1 is a side elevation partly in section and partly in diagram of a meter and its connections. Fig. 2 is a plan of the same. Fig. 2ª is a detail. Figs. 3 and 4 show a form of inductance coil. Fig. 5 illustrates a modified form of core for the inductance coil. Figs. 6, 7, 8, 9 and 10 illustrate modified arrangements of the actuating coils of the meter. Fig. 11 illustrates a modified form of the meter.

Referring to the figures, K represents a suitable supporting frame with horizontal arms $k'$ and $k^2$ for carrying the various parts of the meter.

A represents the shunt coil designed to carry a small current and wound therefore with a considerable number of turns of small wire. Its resistance should be as low as is consistent with these requirements. This coil may be connected in shunt with the work circuit or receive an impressed electromotive force proportional to that of the work circuit, as for instance, through a transformer or its equivalent.

B and B' (see Fig. 2) represent the series coils, that is to say, coils connected in series with the translating devices or receiving a current proportional to that delivered to the translating devices, as for instance, through a transformer. These coils B, B', may be connected either in parallel or in series with each other and should be wound with wire of sufficient size to carry the maximum current without undue heating.

A convenient way to support the coils B, B', is to place them upon the horizontal arm $K^2$, either directly mounted thereon or first placed upon a base-plate M' carrying a suitable clamping device. The coil A is supported in a similar manner from the arm $k'$ by means of a clamping device $q$. Either of these clamping devices may be made adjustable in position as shown by the adjusting screws $r$ and $r'$ passing through a slot $s$.

Between the coil A and the coils B, B', there is placed an armature D mounted upon a shaft E, the lower end of which rests in a suitable bearing L. The upper end of this shaft is geared to a suitable counting train C, in a well-known manner. The armature illustrated in the drawings consists of a disk of conducting metal, such for instance, as aluminium or copper. This disk is made comparatively thin so as to have, in addition to the other advantages hereinafter specified, as little weight as possible and therefore cause little friction and wear, and prevent danger of breaking the delicate bearings of the shaft in handling. To prevent the disk from vibrating under the influence of the alternating current, it is desirable to stiffen it by giving its cross-section a greater depth than that due to the thickness of the plate, as for instance, by turning over the edge as shown at $d$.

The coil A is connected across the conductors 1, 2, leading to the work circuit W as indicated by means of conductors 3 and 4. In this shunt circuit, there is interposed the inductance coil T, which is shown in detail in Figs. 3 and 4. It consists of a coil $t'$ of insulated wire applied to a laminated soft iron core $t^2$ having one or more interruptions in its circuit which are shown at $t^3$. These interruptions or air gaps may be located at any convenient point in the magnetic circuit, provided they intersect all the lines of force through the iron. Instead of the two air gaps $t^3$, a single air gap, as shown in dotted lines at $t^4$, may be used; or a single magnetic circuit $t^2$ with a single air gap $t^5$ may be used as shown in Fig. 5. The exact proportions of the parts of the inductance coil can be readily determined in accordance with the considerations herein set forth, as applied to a meter designed for any given range of working.

It is sometimes of advantage to provide one or more of the coils, as for instance, the shunt coil A with a core $a$ which may be adjustable in position as indicated in Fig. 2ª. The form of core shown consists of a central portion $a$ which may be adjustable in the coil, and two side portions $a'$, extending across the top and down the sides of the coil toward the disk D. This core serves to direct the lines of force through the disk and at the same time affords a convenient means of adjusting the constant of the meter. It is, however, not necessary to employ a core in the coil A.

The coils A and B, B', should be so located with reference to each other that their magnetic fields combine to form a single resultant field which, owing to the difference of phase between the shunt and the series fields respectively, is a shifting field and therefore capable of producing motion by its inductive action upon the disk. The torque thus produced is proportional to the product of the strength of the shunt and the series magnetic fields and approximately to the sine of the angle of phase difference existing between them, and as hereinbefore explained, this product is proportional to the energy transmitted to the work circuit.

In order that the speed of the disk and consequently the registration of the meter shall be proportional to the energy transmitted to the work circuit, it is necessary that the disk be subjected to a retarding force directly proportional to the speed, and for this purpose one or more magnets F, F', of constant strength are employed so located as to embrace a portion of the disk D between their poles. These magnets should be of sufficient strength to render the speed slow relatively to that of synchronism, and also slow enough to render the air resistance inappreciable. The eddy currents produced by the disk in this motion through the magnetic field, produce a retarding force directly proportional to the speed.

It is obvious that various modifications of the form and details of the meter may be made without departing from the spirit of my invention, such for instance, as the construction, adjustment and location of the iron core in the meter coils; and in the form of core and of the winding used in the inductance coil, and the method of rendering the disk armature D rigid. The shape of the armature may also be variously modified.

Many of the advantages due to the peculiar character of the inductance coil herein described may be utilized in connection with armatures of various different constructions. Thus the armature, if of suitable form, may contain more or less iron for the purpose of increasing the torque and may have a closed winding of any suitable form. Certain special advantages, particularly in connection with this inductance coil, are secured by constructing the armature without iron and of large superficial area, as in the disk form herein shown and described, because in such a form there is a considerable area over which the induced currents may flow, in proportion to the total cross-section, thereby securing a non-inductive form, that is to say, a form having a small coefficient of self-induction. This results in an induction of currents in the disk, proportional to the periodicity and having a small lag. For this reason, among others, an armature of this form is well adapted to be used in connection with the inductance coil described, which varies the shunt current in an inverse ratio to the periodicity, and consequently causes the meter to compensate for changes of periodicity.

The form and arrangement of the meter coils may also be varied in many ways, some of which are indicated in Figs. 6, 7, 8, 9 and 10. In Fig. 6 one of the series coils is omitted. In Fig. 7 two sets of coils similar to those shown in Fig. 6 are employed and placed diametrically opposite. In Fig. 8, two shunt and three series coils are employed. In Fig. 9 a single flattened coil B is located in such a manner as to come within the fields of two diametrically placed coils A and A'. The coils A, A' and B in this case may be shunt and series coils respectively, and vice versa. In Fig. 10, two flattened coils A and B are shown having their longest axes inclined to each other.

In Fig. 11, the armature D consists of a cup-shaped or cylindrical shell. The coil A which may be, as here shown, the shunt coil connected in series with the inductance coil T, is placed within the shell D and may be divided into two parts so as to allow a space for the shaft E. The coils B, B', here shown as the series coils, surround the armature D and are so placed that their common axis is not coincident with that of the coil A, and may be, as here shown, at a right angle thereto. An iron core $a$ may be introduced within the coil A. The armature D is here shown as revolving between the coils A and B, B'. The retarding device is shown in this instance as being separate from the armature and it consists of a disk $D^2$ mounted on the shaft E and revolving between the poles of the magnets F and F'. This disk may be replaced by any closed conductor of convenient form rotating with the shaft, but it is of advantage to construct it of a metal having approximately the same temperature coefficient as that of the armature D, so that the retarding effect may be varied by changes of surrounding temperature in the same ratio as the variations in torque in the armature from the same cause. In the form of meter shown in Figs. 1 and 2, where the retarding magnets are applied to the armature itself, not only are the changes of temperature in the surrounding atmosphere compensated for, but also the effects due to the heating of the armature caused by the currents induced therein.

The special form of inductance coil herein shown and described, is also applicable, for many or all of the purposes herein set forth, to other forms of measuring, indicating and controlling devices, and to other apparatus.

The particular organization of the apparatus herein shown and described serves to illustrate the general principles of the invention and the methods of connection and operation, but it will be understood that I do not confine my claims to these particular applications of the novel features of my invention, and I desire it to be understood also that by the term "meter" I refer to measuring instruments generally, whether registering, indicating or recording instruments.

I claim as my invention—

1. The method of measuring the energy transmitted by single phase alternating electric currents, which consists in establishing two alternating magnetic fields, one proportional to, and in phase with the current transmitted to the work circuit, the other derived from, and proportional to the impressed electromotive force of the work circuit and lagging approximately ninety degrees behind that electromotive force, producing by such two magnetic fields a resulant shifting magnetic field, producing by such resultant field mechanical motion against a force which is proportional to the speed, and registering such motion.

2. The method of measuring the energy transmitted by single phase alternating electric currents, which consists in developing two alternating magnetic fields, one proportional to and having a definite phase relation to the current transmitted to the work circuit, the other derived from, and proportional to the impressed electromotive force of the work circuit and under varying conditions of lag in the work circuit differing from the first field by approximately the complement of the angle of such lag, producing by such two magnetic fields a resultant shifting magnetic field, producing by such resultant field mechanical motion against a force which is approximately proportional to the speed, and registering such motion.

3. In an electric meter for alternating currents, operated by inductive effects of currents in a shunt-connected and a series connected coil, the method of compensating for changes of periodicity which consists in inductively varying the shunt current in an inverse ratio to the periodicity.

4. In an electric meter, the combination of an actuating coil and its circuit, and an inductance coil comprising a winding of insulated wire and an inclosing sub-divided iron core having an interruption in the magnetic circuit, the reluctance across said interruption being greatly in excess of that of the remaining portion of the magnetic circuit, the total reluctance being sufficiently low to render the coefficient of self-induction high relatively to that of the winding alone, the counter electromotive force of said inductance coil constituting the principal element of impedance in said circuit.

5. In an electric meter for alternating currents, the combination of a movable element having a closed conducting circuit of non-inductive form, a derived circuit, an actuating coil included therein and operating proportionally to the current therein, and a coil connected in said derived circuit having a practically constant coefficient of self-induction and the inductance of which constitutes the greater part of the total impedance of said derived circuit.

6. The combination with an electric meter operated by alternating currents, of a coil of high inductance and relatively low resistance, connected in that portion of the meter circuits wherein the current varies with the difference of potential of the work circuit, said coil producing the greater part of the total impedance of said meter circuit, and having a practically constant coefficient of self-induction within the maximum limit of working.

7. In an electric meter for measuring the energy transmitted by an alternating current, the combination with a movable armature and energizing coils for producing a resultant shifting field acting to impel the same, of an inductance coil connected in series with one of the coils comprising an exciting coil and a core of laminated soft iron having an air gap interposed, the amount of iron of said core being sufficient to produce a large lag without approaching magnetic saturation and the air gap being sufficient to require a magnetizing current large relatively to that required for magnetizing the iron.

8. In an alternating current electric meter having a shunt circuit, an inductance coil in the shunt circuit consisting of a magnetizing coil, and an interrupted laminated soft iron core, the cross-section of iron in which is sufficient to remain well below magnetic saturation, while the interruption or air gap in the core is sufficient to require a magnetizing current which is large relatively to that required for magnetizing the iron, but the iron portion of the core occupying a sufficient length of the magnetic circuit to secure a high coefficient of self-induction with relatively very small loss due to the resistance of the winding.

9. In an electric meter for measuring alternating electric currents, an inductance coil for controlling the current through the shunt circuit comprising a coil of conducting wire and a laminated soft iron core having an air gap which is small in proportion to the total length of the core.

10. In an electric meter for alternating electric currents, an inductance coil comprising a conducting coil and a nearly closed laminated soft iron core having an interposed air gap of sufficient length relatively to the length of the iron core to render the form of the waves of magnetizing current practically free from distortions due to the magnetization of the iron.

11. In an electric meter for alternating currents an inductance coil consisting of a conducting coil and a nearly closed laminated soft iron core having an air gap sufficient to require for any given magnetization a magnetizing force largely in excess of that required to equally magnetize the iron.

12. In an alternating current electric meter an inductance coil having a nearly closed soft iron core, in which the air gap is sufficient to render the apparent energy of the circuit in which said coil is included large relatively to the energy consumed in the winding and in the iron and at the same time maintaining a low magnetization of the iron.

13. In an electric meter for alternating currents an inductance coil having an approximately closed soft iron core in which the air gap is sufficiently large relatively to the length of the iron portion to cause the magnetization to be proportional to the magnetizing current through a wide range.

14. An inductance coil consisting of a magnetizing coil, an interrupted soft iron core, the cross-section of iron in which is sufficient to remain well below magnetic saturation, while the interruption or air gap in the core is sufficient to require a magnetizing current which is large relatively to that required for magnetizing the iron, but the iron portion of the core occupying a sufficient length of the magnetic circuit to secure a high coefficient of self-induction with relatively very small loss due to the resistance of the winding.

15. An inductance coil comprising a winding and a nearly closed laminated soft iron core having an interposed air gap of sufficient length relatively to the length of the iron core to render the form of the waves of magnetizing current practically independent of the distortions due to the magnetization of the iron.

16. In an electric meter, the combination of an inductance coil in which the magnetizing current is approximately proportional to the induction, an armature and means for subjecting it to an inductive influence proportional to the magnetizing current.

17. In an electric meter, the combination of an inductance coil in which the magnetizing current is approximately proportional to the induction, an armature of conducting material having a small coefficient of self-induction, and means for subjecting said armature to an inductive influence proportional to the magnetizing current.

18. In an alternating current electric meter having a resultant shifting field produced by two magnetic fields or groups of fields, differing in phase, an inductance coil of constant permeability throughout the working limits of the meter controlling one of said magnetic fields and rendering its wave form approximately the same as that of the impressed electromotive force, and an armature, the permeability of whose magnetic circuit is approximately constant, subjected to the action of the two fields, the induction of each field having a wave form similar to the current producing it.

19. In an electric meter for alternating electric currents, the combination of inducing coils, a movable element in which for given currents in said inducing coils, a torque is produced directly proportional to the periodicity and an inductance coil in which the current is inversely proportional to the periodicity.

20. An inductance coil comprising a winding of insulated wire and an inclosing sub-divided iron core having an interruption in the magnetic circuit, the reluctance across said interruption being greater than that of the remaining portion of the magnetic circuit, the total reluctance being sufficiently low to render the coefficient of self-induction high relatively to that of the winding alone.

21. The method of maintaining in an actuating circuit of an inductively operated electric meter, an inductive effect proportional to the electromotive force impressed upon said circuit independently of the periodicity, which consists in creating by means of the current in said circuit a controlling magnetic field, and by means of the counter electromotive force induced by said field, automatically varying the current in said circuit in inverse ratio to the periodicity.

22. The combination of a circuit conveying an alternating current, an actuating device in said circuit tending to vary its effects proportionally to the periodicity of said current, and means for inductively varying the current in said circuit in inverse proportion to the periodicity.

23. In an alternating current meter, an actuating coil in shunt circuit, and a compensating inductance coil connected in said circuit made to automatically vary the current in said circuit in inverse ratio to the periodicity.

24. In an alternating current meter, a current controlling device made to automatically vary the current in one of the actuating circuits in inverse proportion to the periodicity.

25. In a meter for alternating electric currents, the combination of an armature and actuating coils therefor, one of said coils being of large wire, adapted for series connection, and the other being of fine wire adapted to be connected in shunt, and an adjustable soft iron core within one of said coils.

In testimony whereof I have hereunto subscribed my name this 15th day of September, A. D. 1894.

OLIVER B. SHALLENBERGER.

Witnesses:
  CHARLES A. TERRY,
  WESLEY G. CARR.